US009285188B1

(12) United States Patent
LoRocco et al.

(10) Patent No.: US 9,285,188 B1
(45) Date of Patent: Mar. 15, 2016

(54) ADJUSTABLE SIGHTING DEVICE FOR ARCHERY

(71) Applicant: TruGlo, Inc., Richardson, TX (US)

(72) Inventors: Paul LoRocco, Dallas, TX (US); John Estridge, Plano, TX (US)

(73) Assignee: TruGlo, Inc., Richardson, TX (US)

( * ) Notice: Subject to any disclaimer, the term of this patent is extended or adjusted under 35 U.S.C. 154(b) by 218 days.

(21) Appl. No.: 13/920,858

(22) Filed: Jun. 18, 2013

(51) Int. Cl.
  *F41G 1/00* (2006.01)
  *F41G 1/467* (2006.01)
  *F41B 5/00* (2006.01)
  *F41G 1/34* (2006.01)
  *F41B 5/14* (2006.01)

(52) U.S. Cl.
  CPC . *F41G 1/467* (2013.01); *F41B 5/14* (2013.01); *F41G 1/345* (2013.01)

(58) Field of Classification Search
  CPC ............ F41G 1/467; F41G 1/345; F41B 5/14
  USPC ................................................. 33/265; 124/87
  See application file for complete search history.

(56) References Cited

U.S. PATENT DOCUMENTS

| | | | |
|---|---|---|---|
| 3,013,336 A | 12/1961 | Pennington | |
| 3,487,548 A | 1/1970 | Frydenlund | |
| 4,473,959 A * | 10/1984 | Saltzman | 33/265 |
| 4,497,116 A | 2/1985 | Hawkins | |
| 4,535,747 A * | 8/1985 | Kudlacek | 124/87 |
| 4,541,179 A | 9/1985 | Closson | |
| 5,359,780 A | 11/1994 | Dallaire | |
| 5,442,862 A | 8/1995 | Newbold et al. | |
| 5,651,185 A | 7/1997 | Vanderheyden et al. | |
| 5,685,081 A * | 11/1997 | Winegar | 33/265 |
| 5,920,996 A | 7/1999 | Hurckman et al. | |
| 5,975,069 A | 11/1999 | Hamm et al. | |
| 6,079,111 A | 6/2000 | Williams et al. | |
| 6,134,794 A | 10/2000 | Raukola | |
| 6,199,286 B1 * | 3/2001 | Reed et al. | 33/265 |
| 6,505,407 B2 | 1/2003 | Savage | |
| 6,796,039 B2 | 9/2004 | Walbrink | |
| 6,868,614 B2 | 3/2005 | Floied et al. | |

(Continued)

OTHER PUBLICATIONS

Hunter's Friend, Bow Sight Selection Guide, Jun. 8, 2013, huntersfriend.com. Retrieved from the internet: Mar. 27, 2015. <URL: http://web.archive.org/web/20130608095552/http://www.huntersfriend.com/sight_selection_guide/sight_selection_guide.html>.*

*Primary Examiner* — Laura Martin
*Assistant Examiner* — Rhyan C Lange
(74) *Attorney, Agent, or Firm* — Alvin R. Wirthlin

(57) ABSTRACT

A selective sight assembly for a sighting device associated with an archery bow or similar devices, has a frame portion defining a sight window and a sight portion connectable to the frame portion. The sight portion includes a sight pin connectable to the frame portion and a light conduit connected to the sight pin for movement therewith. The light conduit has a first light coupling end and a second light transmitting end that defines a sight point for view by a user. A plurality of light collectors are provided, with each light collector having a second light coupling end for selective optical coupling with the first light coupling end. Movement between the light conduit and the light collectors causes optical coupling between the first light coupling end and one of the second light coupling ends. The frame portion is rotatable about three mutually perpendicular axes to enable tuning of the selective sight assembly for a particular archery bow configuration.

46 Claims, 7 Drawing Sheets

(56) References Cited

U.S. PATENT DOCUMENTS

| | | |
|---|---|---|
| 7,360,313 B1 | 4/2008 | Hamm et al. |
| 7,475,485 B1 | 1/2009 | Hamm et al. |
| 7,513,050 B2 | 4/2009 | Kroening, Jr. |
| 7,584,543 B1 | 9/2009 | Boyd |
| 7,644,503 B2 | 1/2010 | Lewis |
| 7,721,453 B1 * | 5/2010 | Young ............................. 33/265 |
| 7,856,728 B1 | 12/2010 | Ozinga |
| 8,448,341 B2 * | 5/2013 | Haney et al. .................... 33/265 |
| 8,839,525 B2 * | 9/2014 | Pulkrabek et al. .............. 33/265 |
| 2002/0073560 A1 * | 6/2002 | LoRocco ......................... 33/265 |
| 2002/0112358 A1 * | 8/2002 | Savage ............................ 33/265 |
| 2004/0107587 A1 | 6/2004 | Floied et al. |
| 2005/0246909 A1 * | 11/2005 | Rager ............................. 33/265 |
| 2013/0174430 A1 * | 7/2013 | Pulkrabek et al. .............. 33/228 |

* cited by examiner

ADJUSTABLE SIGHTING DEVICE FOR ARCHERY

CROSS-REFERENCE TO RELATED APPLICATIONS

This application is related to U.S. application Ser. No. 13/422,146 filed on Mar. 16, 2012, the disclosure of which is hereby incorporated by reference.

BACKGROUND OF THE INVENTION

This invention relates generally to sighting devices for firearms, archery bows, or other projectile launching devices, and more particularly to an adjustable archery sighting device having sight pins of different configurations and/or different illumination effects.

Sighting devices using short segments of light gathering optical fibers to form aiming points at different distances from the target are currently in use. Such optical fibers are typically fluorescent-doped and thus have the capability of gathering ambient light along their length and transmitting that light to their ends. Under ideal lighting conditions, one end of the optical fiber typically serves as a bright aiming point with the brightness being directly dependent on the level of ambient light incident on the length of optical fiber. Since the ambient light equally affects the brightness of all the sight points, confusion can occur when selecting the correct sight point for a particular distance between the target and the user. Although sighting devices with a single sight pin do not have this drawback, such pins are only capable of creating an illuminated sight dot or point with a single wavelength of visible light. If it is desirous or becomes necessary to change the optical fiber, a labor-intensive process is typically required to remove the old optical fiber and replace it with a new one, if that is even possible.

In addition, when the user desires to sight in a distant target, accuracy in aiming not only depends on proper windage and elevation adjustments for a particular archery bow configuration, but also on the size of the sight pin and whether or not the sight window is properly oriented with respect to the riser of a bow. Oftentimes, the sight pin blocks the impact zone of the distant target, especially when the target is small or far away. In the past, changing the relatively thick sight pin for a relatively thin sight pin involved replacing the entire sight assembly. Such a procedure is impractical in the field, especially since relatively large parts must be carried by the user and the replacement sight must be properly tuned for the particular archery bow configuration.

Moreover, due to various procedures and tolerance variations in the manufacturing process, as well as inadvertent bumps that the sighting device may be exposed to in the field, the sight window, and thus the sight pin, can be out of alignment with the line of sight of the user as well as the riser of the bow.

Accordingly, it would be desirous to provide a sight assembly that overcomes disadvantages of the prior art.

SUMMARY OF THE INVENTION

In accordance with one aspect of the invention, a selective sight assembly includes a frame portion defining a sight window and a sight portion connectable to the frame portion. The sight portion includes a sight pin connectable to the frame portion and a light conduit connected to the sight pin for movement therewith. The light conduit has a first light coupling end and a second light transmitting end that defines a sight point for view by a user. A plurality of light collectors are provided, with each light collector having a second light coupling end for selective optical coupling with the first light coupling end. Movement between the light conduit and the light collectors causes optical coupling between the first light coupling end and one of the second light coupling ends.

In accordance with a further aspect of the invention, an illuminated sighting device includes the selective sight assembly, a bracket member for attachment to an archery bow; and an articulated support connected between the selective sight assembly and the bracket member for adjusting a position of the selective sight assembly about first, second and third mutually orthogonal axes.

In accordance with yet a further aspect of the invention, a sight assembly includes a frame portion defining a sight window and a sight portion connectable to the frame portion. The sight portion includes a first sight pin having a first base section and a first pin section, and a second sight pin having a second base section and a second pin section. The first and second base sections are substantially similar in configuration and the first and second pin sections comprise different configurations. A sight base is fixedly connected to the frame portion and is adapted to receive only one of the first and second base sections at a time.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

Figure 1:
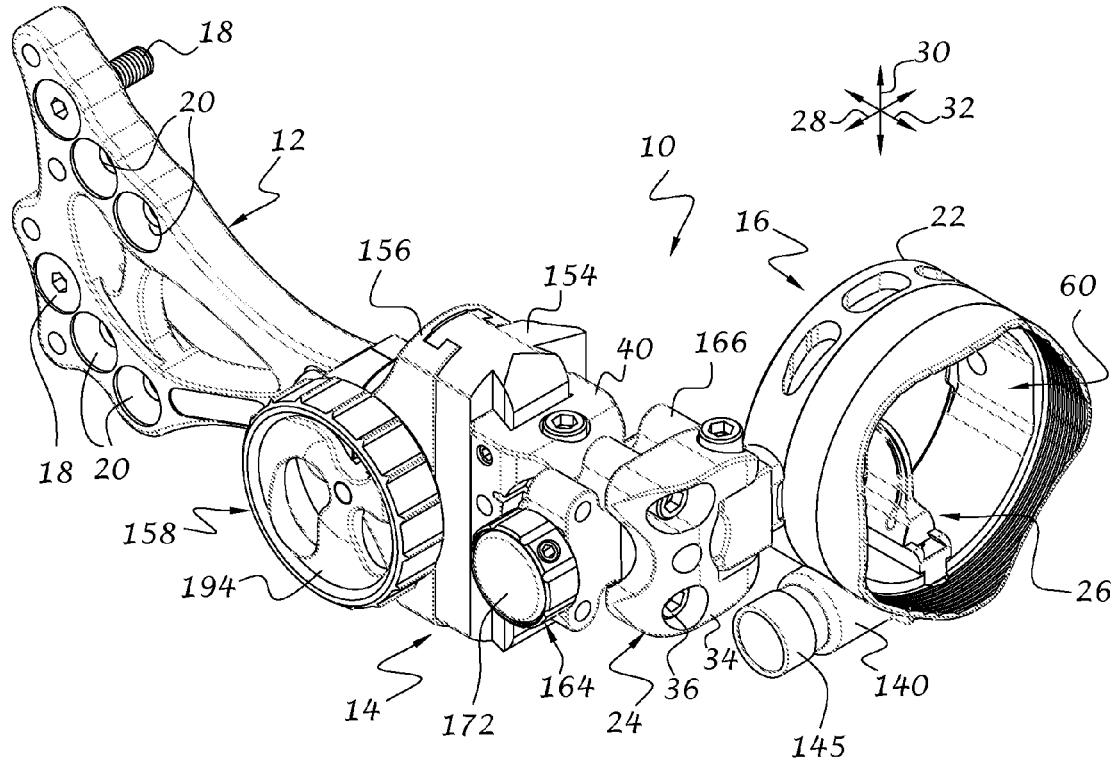
FIG. 1 is a front right isometric view of an illuminated sighting device in accordance with an exemplary embodiment of the present invention.
Figure 2:
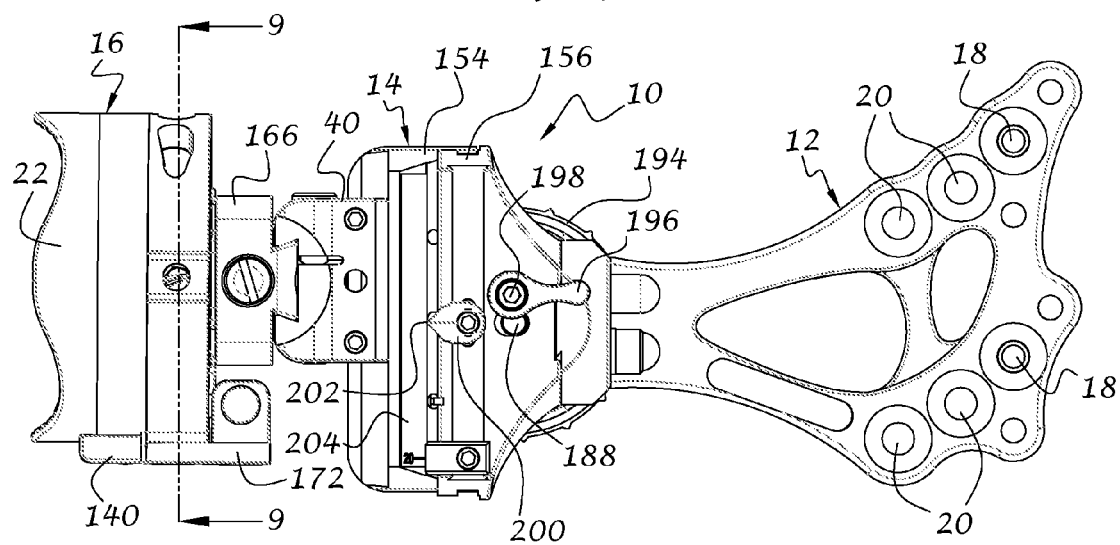
FIG. 2 is a left side elevational view thereof.
Figure 3:
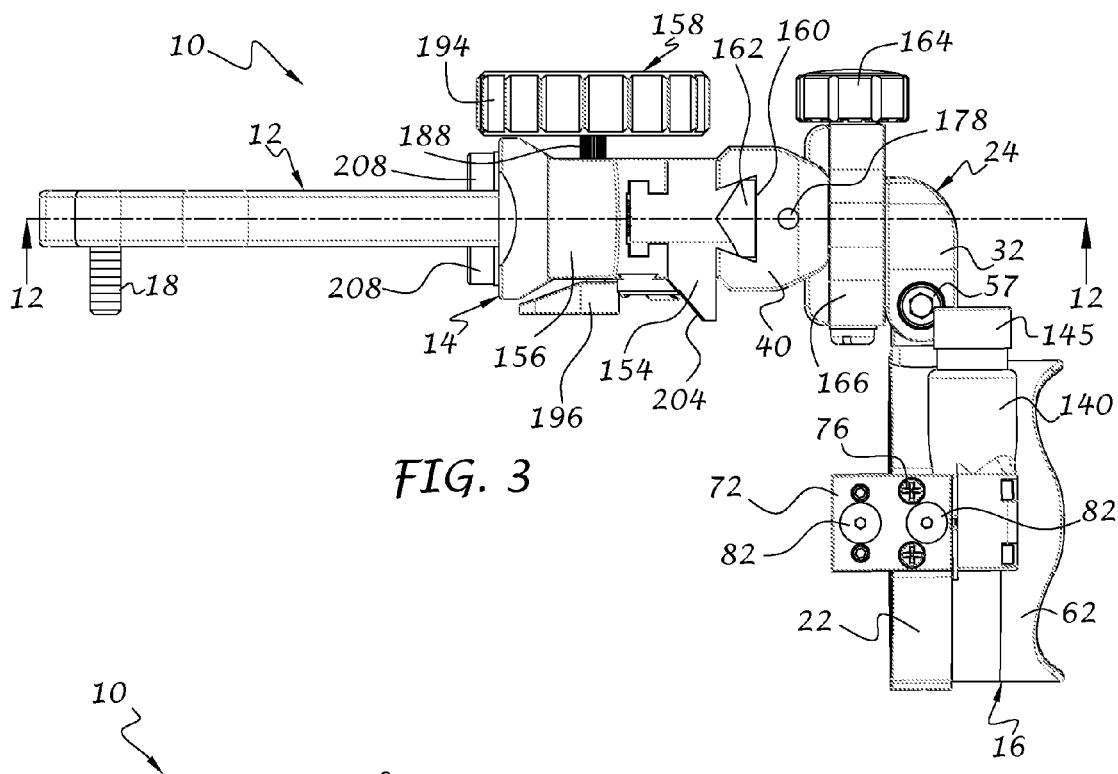
FIG. 3 is a bottom plan view thereof.
Figure 4:
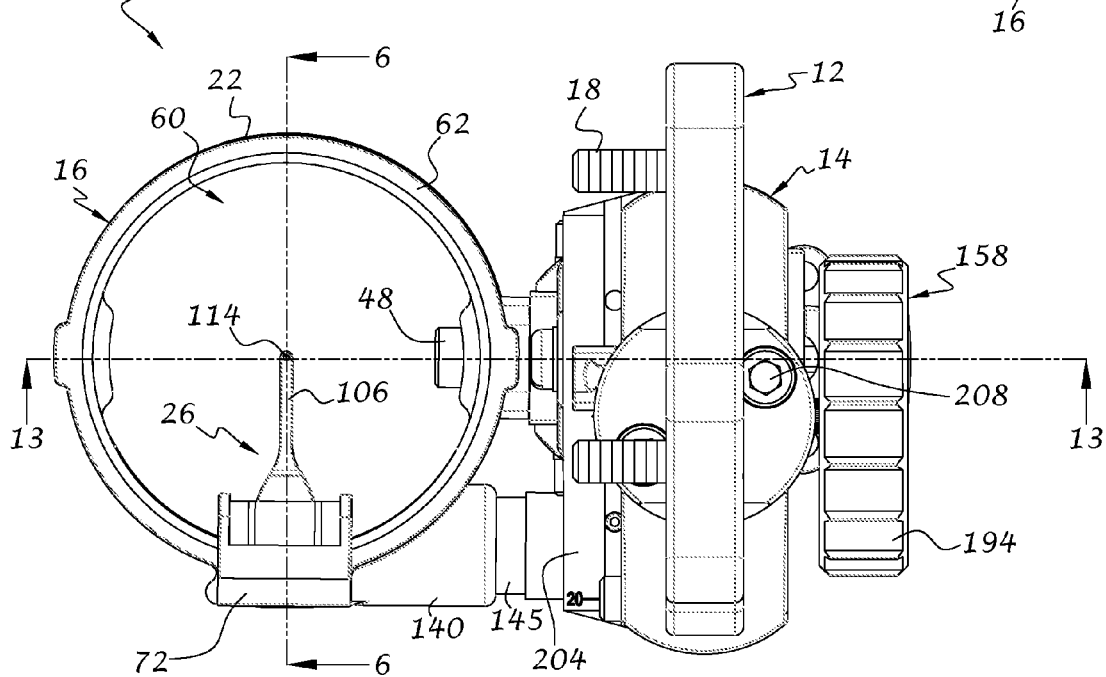
FIG. 4 is a rear elevational view thereof.

It is noted that the drawings are intended to depict typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring to the drawings, and to FIGS. 1-4 in particular, an illuminated sighting device 10 in accordance with the present invention is illustrated. The sighting device 10 as shown is embodied as a bow sight. To this end, the sighting device 10 preferably includes a bracket member 12, an adjustment member 14 connected to the bracket member 12, and a selective sight assembly 16 connected to the adjustment member 14 for providing one or more luminous sight points or dots. The bracket member 12 is useful for attaching the sighting device to a bow (not shown) or the like via fasteners 18 that extend through openings 20 in the bracket member 12 and into the bow structure (not shown) in a conventional manner. However, it will be understood that the sighting device 10 may be adapted for use with any projectile launching device such as a crossbow, rifle, pellet gun, BB gun, pistol, paint marker, and the like, and can be adapted for use with other devices, such as telescopes, sighting scopes, and so on, in order to quickly align the device with a distal target or scene.

With additional reference to FIGS. 4-9, the selective sight assembly 16 preferably includes a frame portion 22 connected to an articulated support 24 and a sight portion 26 connected to the frame portion 22. The articulated support 24 is preferably rotationally adjustable about three mutually perpendicular axes, such as lateral axis 28, vertical axis 30, and longitudinal axis 32 (FIG. 1) so that the frame portion, and thus the sight portion, can be adjusted about the axes 28, 30, and 32. In this manner, variations in manufacturing, user preferences, and so on, can be accommodated.

Figure 9:
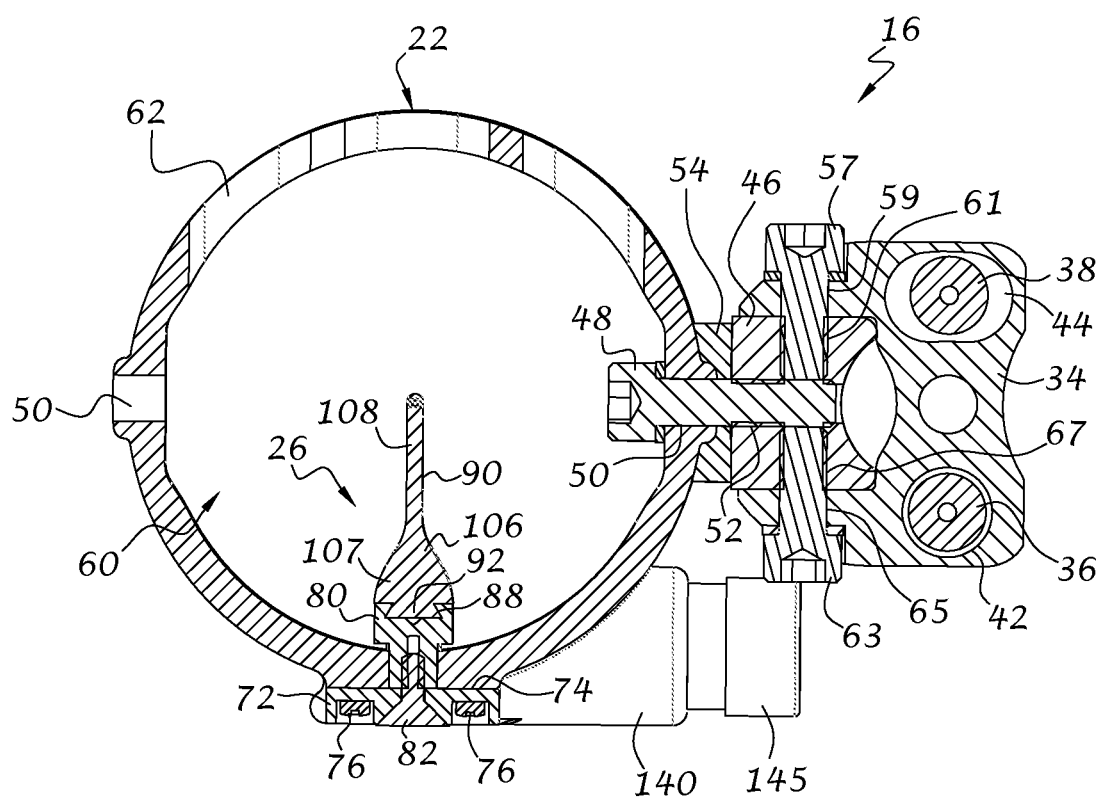
FIG. 9 is a sectional view of the sighting device taken along line 9-9 of FIG. 2.

The articulated support 24 preferably includes a yoke 34 connected to the adjustment member 14 for limited pivotal movement about the axis 32. This is accomplished through a first fastener 36 and a second fastener 38 that extend through the yoke 34 and thread into a body 166 of a windage adjustment mechanism 164 associated with a first adjustment block 40 of the adjustment member 14. The adjustment member 14 will be described in greater detail below. As best shown in FIG. 9, the yoke 34 has a first opening 42 for receiving the first fastener 36 and a second opening 44 for receiving the second fastener 38. Preferably, the second opening 44 is elongate in shape so that, when the fasteners 36, 38 are loose, the yoke 34 has limited pivotal movement about the first fastener 36, and thus the longitudinal axis 32. In this manner, the frame portion 22 and sight portion 26 can be adjusted about the axis 32 to compensate for variations in tilt or squareness of the selective sight assembly 16 during manufacturing and/or in accordance with user preferences.

The articulated support 24 also preferably includes a link 46 that is pivotally connected to the frame 22 so that the frame can tilt about the lateral axis 28. The link 46 is also pivotally connected to the yoke 34 so that the frame 22 can pivot about the vertical axis 30. As best shown in FIG. 9, the link 46 is preferably connected to the frame 22 via a fastener 48 that extends through an opening 50 in the frame 22 and threads into an aperture 52 of the link 46. The fastener 48 is coincident with, or parallel to, the lateral axis 28 so that the frame portion 22 and sight portion 26 can rotate about the fastener, and thus the lateral axis 28, during adjustment of the frame portion 22 and sight portion 26. A locking member 54 is located between the link 46 and the frame 22 to prevent relative tilting movement when the fastener 48 is tightened. Locking protrusions or ridges 56 (FIG. 5) are formed on the locking member 54 for engaging a surface 58 of the articulated support 24 to ensure good locking engagement therebetween. The yoke 34 is also pivotally connected to the link 46 through an upper fastener 57 that extends through an upper opening 59 in the yoke 34 and threads into an upper opening 61 in the link 46, and a lower fastener 63 that extends through a lower opening 65 in the yoke 34 and threads into a lower opening 67 in the link 46. The fasteners 57, 63 are parallel with the vertical axis 30 so that the frame 22 can pivot about the vertical axis 30 with respect to the articulated support 24.

It will be understood that the term "fastener" as used herein and throughout the specification can include, but is not limited to, threaded bolts or screws, shafts, dowel pins, spring pins, cylindrical bearings, and so on, without departing from the spirit and scope of the invention. Where a non-threaded fastener is used, it may be secured into one of the openings through press-fitting, adhesive bonding, welding, and so on.

The frame portion 22 preferably includes a generally circular wall 62 that forms a sight window 60 within which the sight portion 26 is adjustably received. If desired, a ring 69 or the like, which preferably includes a reflective or luminescent material, can be mounted on the rearward side of the circular wall 62 to illuminate the sight window 60 during low light conditions. The sight window 60 can be open or closed and be of any shape, depending on the configuration of the circular wall 62, and serves to at least partially frame a distal target to thereby facilitate aiming. A slot 64 (FIG. 5) is formed at a bottom of the wall 62 for receiving the sight portion 26, as will be described in greater detail below. A forward end 66 of the wall 62 has a threaded portion 68 for receiving a lens assembly 70 (FIG. 11) or the like, in accordance with a further embodiment of the invention, as will be described in greater detail below. A mounting plate 72 is connected to a lower surface 74 of the frame portion 22 via fasteners 76 that extend through openings 77 formed in the mounting plate 72 and thread into openings 78 formed in the lower surface 74.

The sight portion 26 has a sight adjustment base 80 connected to the mounting plate 72 via a fastener 82 that extends through an opening 84 (FIG. 6) in the mounting plate and threads into an opening 86 in the adjustment base 80. If desired, a bubble level 79 can be provided in a holder 81, which is in turn connected to the mounting plate 72 via a fastener 82 that extends through an opening 84 in the mounting plate and threads into an opening 83 in the holder 81.

Figure 6:
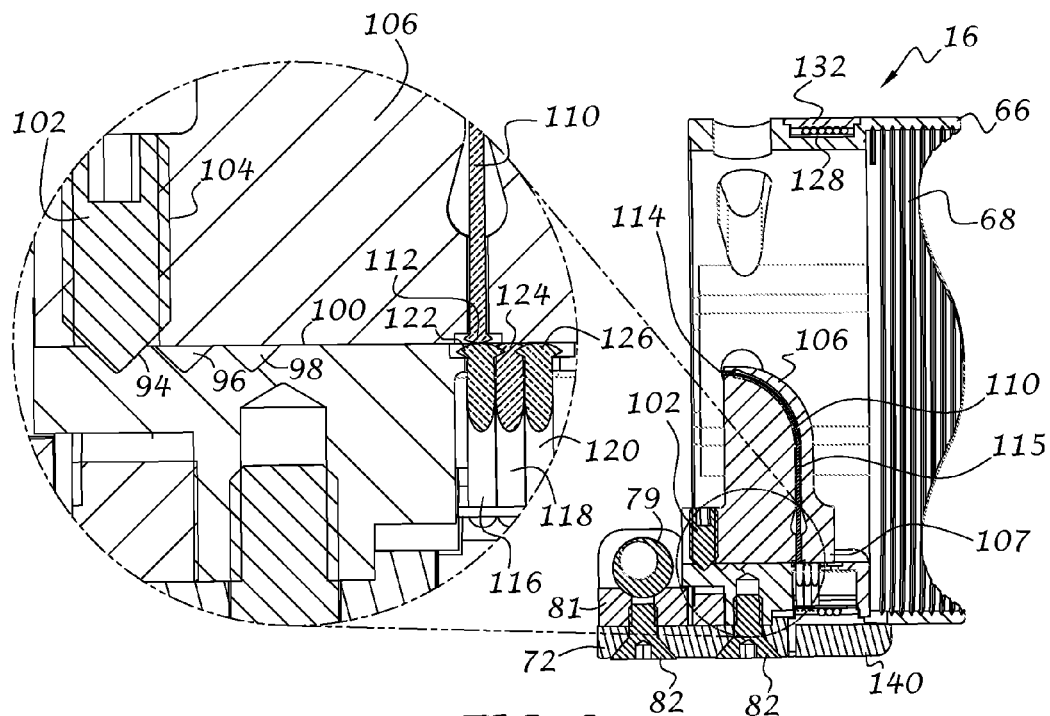
FIG. 6 is a sectional view of the selective sight assembly taken along line 6-6 of FIG. 4 and showing the sight pin in a first position.

As best shown in FIGS. 6 and 9, the sight adjustment base 80 preferably includes a dovetail-shaped groove 88 for receiving a mating dovetail-shaped projection 92 (FIG. 9) of a sight pin 90 so that the sight pin is slidably adjustable along the groove 88 to a plurality of discrete adjustment positions. To that end, small, conically-shaped depressions 94, 96, and 98 are formed in a floor 100 of the sight base 80 for receiving a detent mechanism 102 associated with the sight pin 90. As shown, the detent mechanism is preferably in the form of a set screw that is threaded into a bore 104 formed in the body 106 of the sight pin 90. The set screw can be received in one of the depressions 94, 96, and 98 to thereby lock the sight pin 90 against movement for a purpose to be described in greater detail below. Although the detent mechanism is shown in the form of a set screw, it will be understood that it can be of any suitable configuration, such as a spring-loaded pin, ball, or lever, a gear mechanism with predetermined detent positions, and so on. It will be further understood that the depressions 94, 96, and 98 may be of any suitable shape. In accordance with a further embodiment, the depressions can be associated with the sight pin 90 and the detent mechanism 102 can be associated with the sight adjustment base 80. It will be understood that more or less stop positions can be provided.

The body 106 of the sight pin 90 preferably includes the dovetail-shaped projection 92 that extends downwardly from a base section 107 thereof and a pin section 108 that extends upwardly therefrom. A light conduit 110 has a light receiving or coupling end 112 (FIG. 6) located at the base section 107 and a light transmitting end that forms a sight point or dot 114 located at a tip of the pin section 108. The light conduit 110 is positioned in an elongate opening 115 formed in the body 106 of the sight pin 90. The light conduit 110 preferably is in the form of a clear or transparent optical fiber with the light transmitting end creating a sight dot for the illuminated sighting device 10. One or both ends of the light conduit 110 can include an expanded lens area so that light coupling and/or light projection for view by an end user can be accomplished over a wider area. Preferably, the light conduit 110 comprises a plastic optical fiber (POF) that includes both core and cladding materials of plastic material, with a refractive index of the cladding material being less than the refractive index of the core material in a convention manner so that light is propagated along the length of the POF with little or no light loss. However, it will be understood that other suitable materials can be used for the POF. It will be further understood that the light conduit 110 can be in the form of a plastic or glass rod, a hollow section extending through the body 106, or any other means for directing light towards the pin section 108 for view by a user during aiming.

Figure 5:
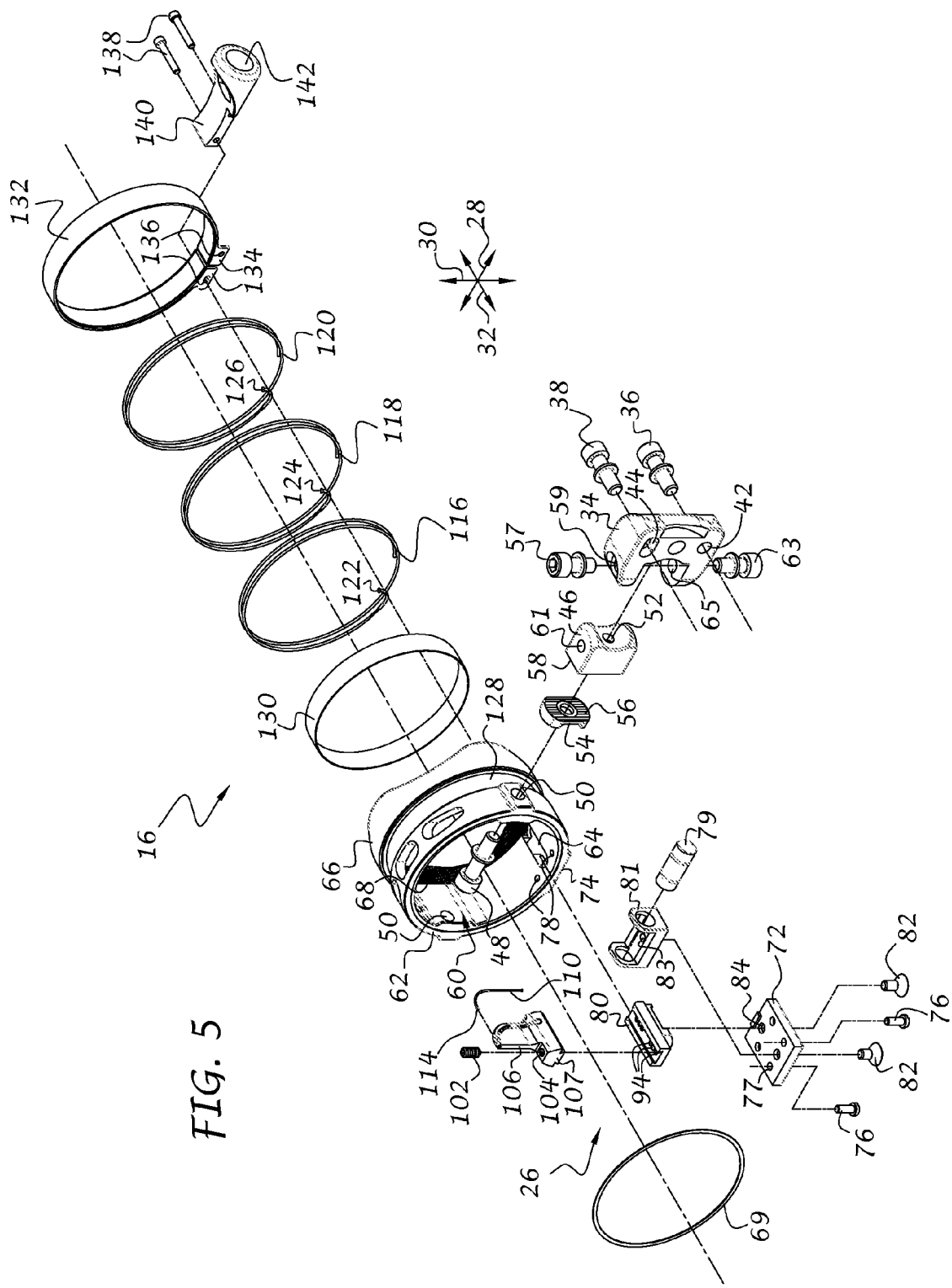
FIG. 5 is a rear right isometric exploded view of a selective sight assembly in accordance with the invention that forms part of the illuminated sighting device.

As best shown in FIGS. 5 and 6, light collectors 116, 118, and 120 are wrapped around the circular wall 60 of the sight window 62 and are received within an annular groove 122 formed in the circular wall 60. The light collectors 116, 118, and 120 are preferably constructed of a fluorescent-doped optical fiber or the like. A suitable fluorescent-doped optical fiber may be constructed of a polystyrene-based or acrylic-based core containing one or more fluorescent dopants that is surrounded by a polystyrene, polymethyl methacrylate, or fluoropolymer cladding. When such an optical fiber receives radiation along its length, energy is absorbed in the optical fiber at a certain wavelength and is re-emitted at both ends of the optical fiber at a longer wavelength. Thus, depending on the amount of radiation absorbed by the optical fiber along its length, a proportionate amount of radiation is emitted at the ends of the optical fiber. Preferably, the core of each optical fiber contains a fluorescent dopant of a different color, such that the optical fibers emit radiation at different visible wavelengths in the electromagnetic spectrum. By way of example, the light collector 116 can emit red light, the light collector 118 can emit yellow light, and the light collector 120 can emit green light. However, it will be understood that the invention is not limited to the exemplary colors or to the number of light collectors shown, as different colors may be used as well as more or less light collectors without departing from the spirit and scope of the invention.

Although the optical fiber is preferably circular in cross section, it is contemplated that other cross sectional shapes such as oval, triangular, rectangular, arcuate, etc., may be used. Moreover, it will be understood that the light collectors 116, 118, and 120 are not limited to the particular materials or colors as set forth in the exemplary embodiment. The core and cladding may be formed out of any suitable transparent or translucent materials, as long as the index of refraction of the core material is greater than the index of refraction of the cladding material. The cladding material itself may be air or other fluid surrounding at least a portion of the core material. Accordingly, it will be understood that the light collector may be in the form of a molded piece of plastic with or without a fluorescent dopant. It will be further understood that the length, diameter or thickness and the amount of dopant within the core of the light collectors can vary and depends on the desired brightness of the sight point as viewed by the user under varying lighting conditions.

Figure 7:
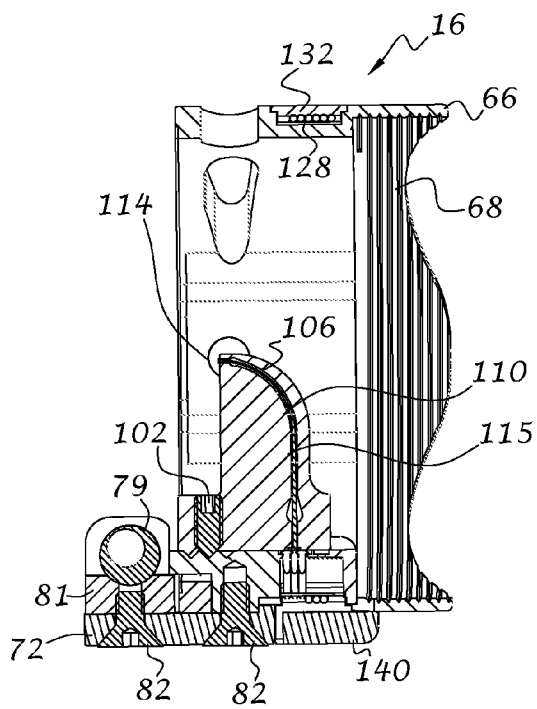
FIG. 7 is a sectional view similar to FIG. 6 showing the sight pin in a second position.
Figure 8:
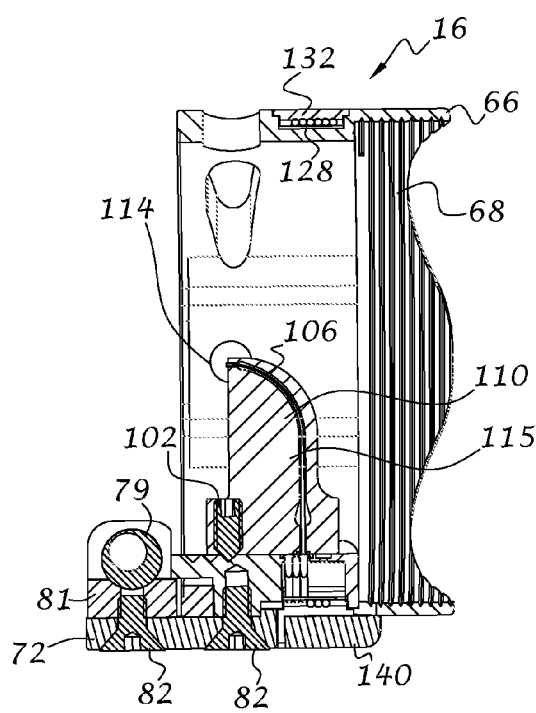
FIG. 8 is a sectional view similar to FIG. 6 showing the sight pin in a third position.

Referring now to FIGS. 6-8, the sight pin 90 can be adjusted to one of the detent positions as previously described. In the detent position shown in FIG. 6, the light coupling end 112 of the light conduit 110 is optically coupled with a coupling end 122 of the light collector 116 such that the light collected at a first visible wavelength along a length of the light collector 116 is transmitted to the light conduit 110 to thereby illuminate the light transmitting end or sight dot 114 with a first light color. Likewise, in the detent position shown in FIG. 7, the light coupling end 112 of the light conduit 110 is optically coupled with a coupling end 124 of the light collector 118 such that the light collected at a second visible wavelength along the length of the light collector 118 is transmitted to the light conduit 110 to thereby illuminate the light transmitting end or sight dot 114 with a second light color. In the detent position shown in FIG. 8, the light coupling end 112 of the light conduit 110 is optically coupled with a coupling end 126 of the light collector 120 such that the light collected at a third visible wavelength along a length of the light collector 120 is transmitted to the light conduit 110 to thereby illuminate the light transmitting end or sight dot 114 with a third light color.

Advantageously, when it becomes necessary or desirous to remove or replace the sight pin 90, for example with a sight pin having a different height, thickness, and/or sight dot size, and so on, the detent mechanism 102 can simply be backed out or otherwise released from the sight adjustment base 80 and the sight pin 90 can be slid out of the dovetail-shaped groove 88. By way of example, the sight pin 90 may be provided in a plurality of different sight point sizes reflective of the diameter or size of the light conduit 110, which may be industry standard 0.010 inch, 0.019 inch, and 0.029 inch diameter or other cross dimension, with the light collectors 116, 118, and 120 having an industry standard 0.029 inch diameter or cross dimension. In this manner, no matter what the size of the light conduit 110 and thus the size of the sight pin 90, there will always be adequate light coupling with the larger sized light collectors. It will be understood that the diameter or cross dimensions of the light conduit and light collectors can greatly vary without departing from the spirit and scope of the invention. It will be further understood that the sight pin can be swapped for another sight pin that is smaller or larger, has a different thickness, style and/or shape, and so on, without departing from the spirit and scope of the invention.

Referring now to FIGS. 5 and 6, a circumferential groove 128 is formed in the circular wall 62 for receiving the light collectors 116, 118, and 120. A collar or sleeve 130 is located in the groove between the circular wall 62 and the light collectors. The collar 130 can have a reflective coating to further enhance ambient light effects on the light collectors. A transparent or translucent cover 132 is positioned over the groove 128 to protect the light collectors. The cover 132 has a pair of tabs 134 with apertures 136 for receiving fasteners 138 that in turn screw into a light mounting block 140. The mounting block 140 includes a threaded opening 142 for receiving a light module 145 (FIG. 1) to artificially illuminate the light collectors 116, 118, and 120 when ambient light is insufficient for a user's preference or needs. The mounting block 140 is in turn mounted to a forward end of the mounting plate 72 via the fasteners 138.

Figure 10:
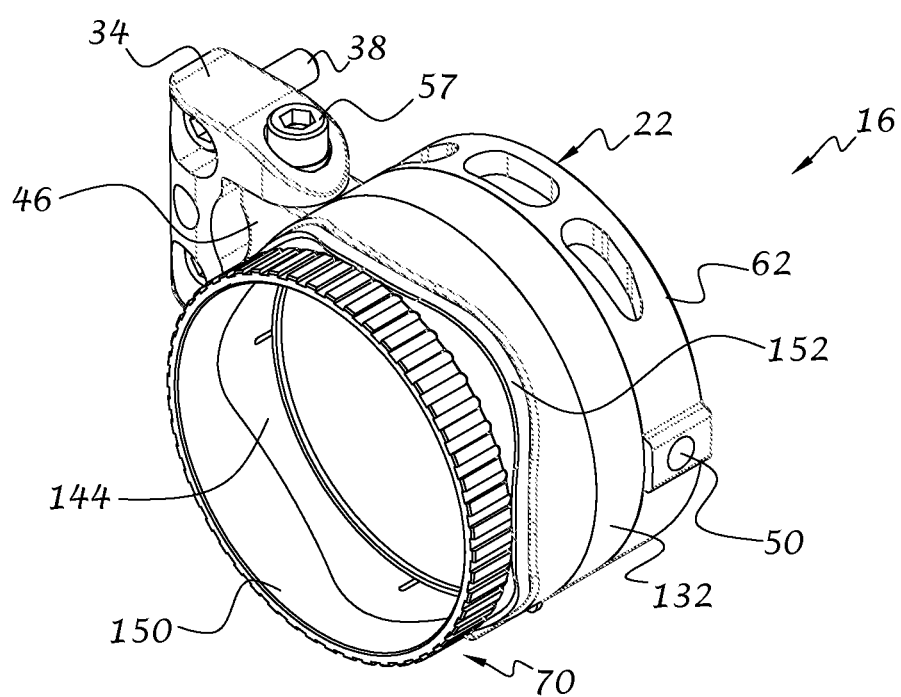
FIG. 10 is a left front isometric view of a selective sight assembly in accordance with a further embodiment of the invention.
Figure 11:
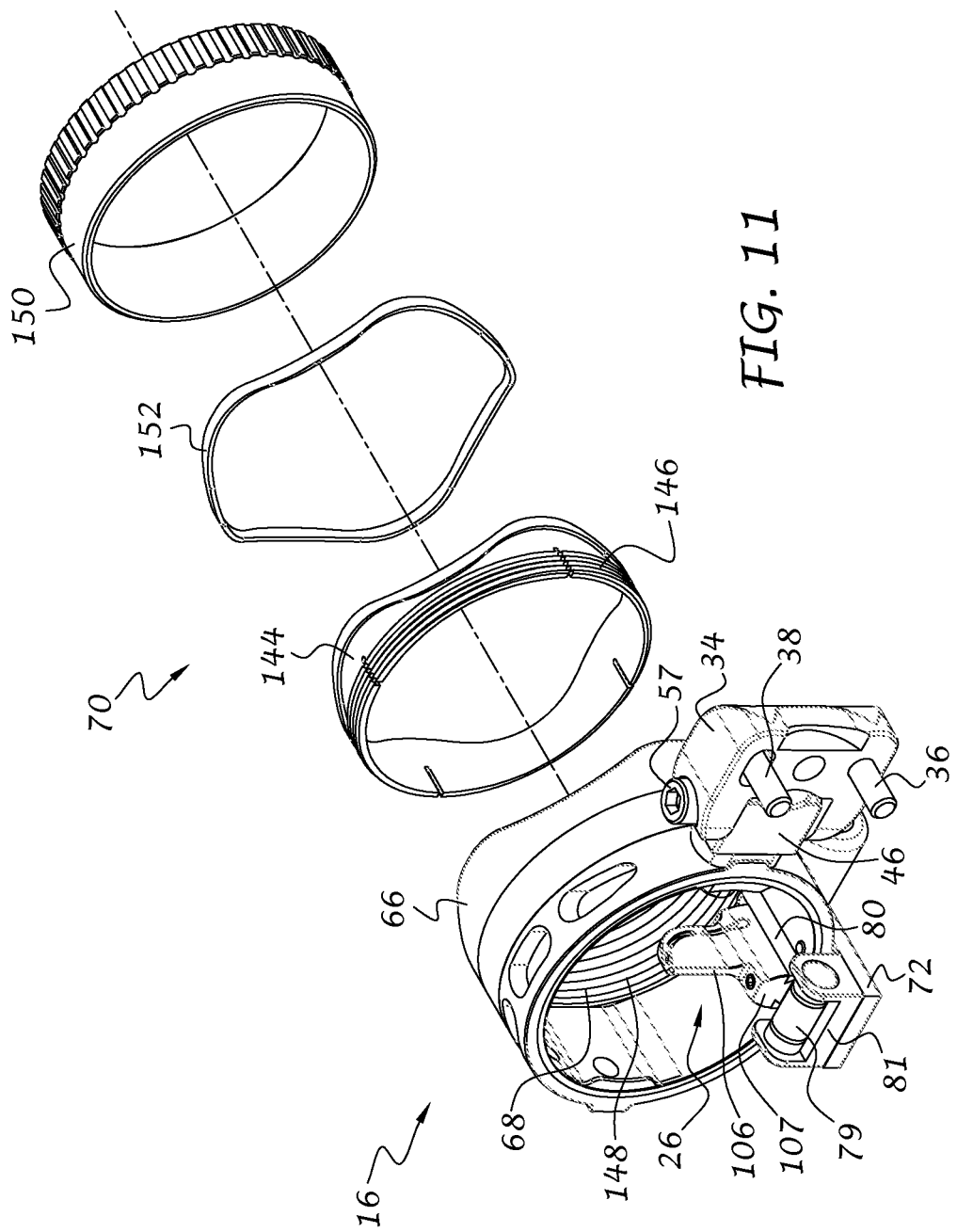
FIG. 11 is a right rear isometric exploded view of the selective sight assembly of FIG. 10.
Figure 12:
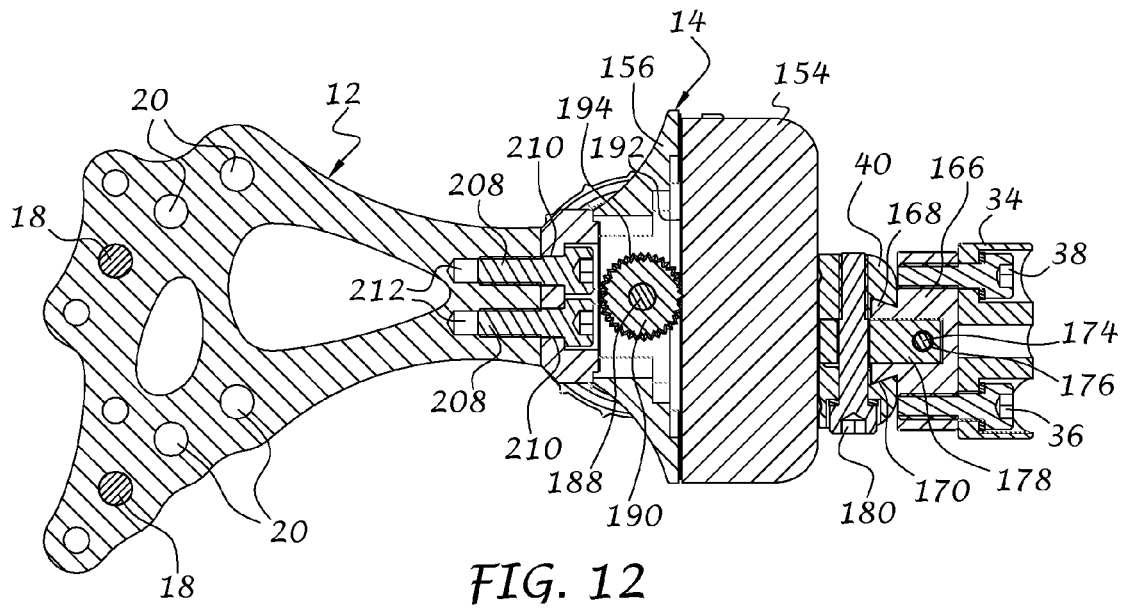
FIG. 12 is a sectional view of the illuminated sighting device taken along line 12-12 of FIG. 3.
Figure 13:
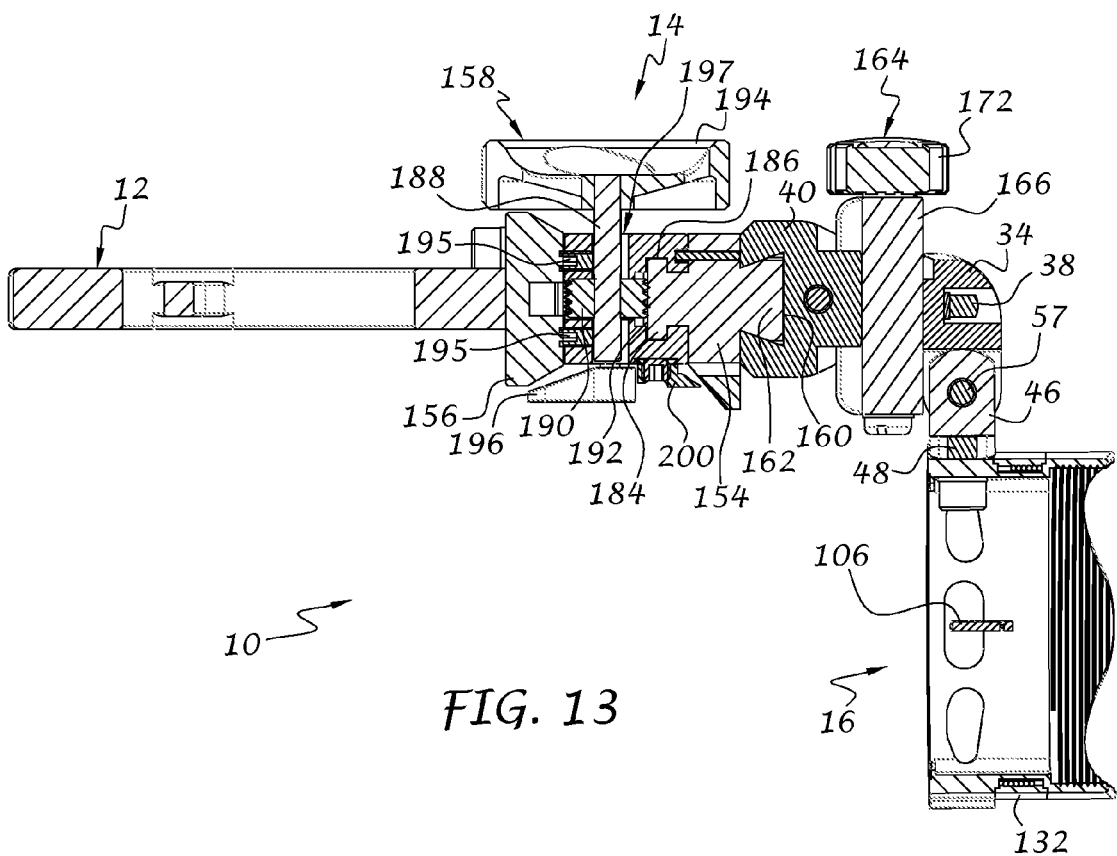
FIG. 13 is a sectional view of the illuminated sighting device taken along line 13-13 of FIG. 4.

As best shown in FIGS. 10 and 11, the lens 70 includes an insert 144 with outer threads 146 that engage the inner threads 148 of the threaded portion 68 associated with the circular wall 62 of the frame portion 22. A lens housing 150 is inserted into the insert 144 and a decorative ring 152 can be mounted on the lens housing 150 between the insert 144 and housing 150. As shown, the lens housing 150 is in the form of a hollow tube, but can include one or more lenses, transparent or translucent plates, light filters, and so on.

Referring now to FIGS. 1, 2, and 12-14, the adjustment member 14 preferably includes a second adjustment block 154 slidably connected between the first adjustment block 40 and a third adjustment block 156. An elevation adjustment mechanism 158 is rotatably connected to the third adjustment block 156 and engages the second adjustment block 154 for manually adjusting the height or elevation of the selective sight assembly 16, and thus the sight pin 90, in accordance with a distance between the user and a distal target.

The first adjustment block 40 preferably includes a rearwardly facing first dovetail-shaped groove 160 for receiving a forwardly facing mating dovetail-shaped projection 162 formed on the second adjustment block 154. A windage adjustment mechanism 164 is connected to the first adjustment block 40 and includes a body 166 with a rearwardly facing dovetail-shaped projection 168 that is slidably received in a forwardly facing second dovetail-shaped groove 170 formed in the first adjustment block 40 opposite the dovetail-shaped slot 162. The first and second grooves 160, 170 preferably extend in transverse directions. A knob 172 is connected to a shaft 174 that in turn extends through the body 166. The shaft is preferably threaded and engages an internally threaded bore 176 of a stud 178 (FIG. 12), which is in turn fixedly connected to the first adjustment block 40 via a threaded fastener 180 that extends vertically through the adjustment block 40 and the stud 178. The fastener 180 is also used to loosen or tighten the second groove 170 about the dovetail-shaped projection 168 to fix the relative position between the body 66 and first adjustment block 40 prior to or after the windage adjustment by a user. The body 166 is also connected to the yoke 34 via a pair of fasteners 182 that extend through the yoke and thread into the body 166.

During windage adjustment, the fastener 180 is loosened and the knob 172 is rotated clockwise or counter-clockwise to adjust the lateral or windage position of the selective sight assembly 16, and thus the sight pin 90. If desired, the fastener 180 can then be tightened to secure the selective sight assembly 16 in the adjusted position.

The second adjustment block 154 preferably includes a rearwardly facing T-shaped projection 184 that slidably engages a forwardly facing mating T-shaped groove 186 formed in the third adjustment block 156. A shaft 188 is rotatably connected to the third adjustment block 156 and extends transverse to the T-shaped projection 184 and T-shaped groove 186. A drive wheel 190 is fixedly mounted on the shaft 188 at a central portion thereof for rotation therewith. Teeth 194 are formed on the outer circumferential surface of the drive wheel 190 for engaging the rear surface 192 of the T-shaped projection 184. Adjustment members 195 (FIG. 13), preferably in the form of set screws or the like, are threaded into the third adjustment block 156 and engage the shaft 188 for adjusting the pressure of the drive wheel 190 against the rear surface 192. A space or gap 197 is formed in the first adjustment block 154 to accommodate forward and rear adjustment of the shaft 188. An adjustment knob 194 is also fixedly mounted to an outer end of the shaft 188 for rotational movement therewith. The adjustment knob 194 can be grasped and rotated by a user to thereby cause the drive wheel 190 to rotate against the rear surface 192 and move the second adjustment block 154, and thus the selective sight assembly 16, in a vertical direction for adjusting the elevation of the sight pin with respect to a distal target. A locking lever 196 is rotatably connected to the third adjustment block 156 via a threaded fastener 198. The fastener 198 extends into the third adjustment block 156 and applies pressure against a side of the drive wheel 190 when the locking lever 196 is rotated in a first direction towards a locked position, to thereby prevent rotational movement of the drive wheel 190 and thus elevation adjustment of the selective sight assembly. Rotation of the locking lever in the opposite direction causes the fastener 198 to move away from the drive wheel 190 so that the selective sight assembly can be adjusted in elevation as previously described.

A pointer 200 is fixedly connected to the third adjustment block 156 and includes a tip 202 that is in alignment with an indicator surface 204. The indicator surface 204 can be marked by a user or fitted with a distance tape or the like (not shown), commonly referred to as a yardage tape, that can be calibrated for the particular archery bow, arrow and other factors for different distances to a distal target. In this manner, once the archery bow is calibrated for different distances and marked on the surface 204, the user need only rotate the adjustment knob 194 until the pointer 200 is in alignment with a mark on the indicator surface 204 indicative of a particular distance between the archer and the target.

The bracket member 12 is preferably connected to the third adjustment block 156 via fasteners 208 that extend through openings 210 in the third adjustment block and thread into openings 212 (FIG. 12) in the bracket member 12. When the fasteners 208 are loosened, the adjustment member 14 can be rotated about axis 32, allowing the user to fine tune the vertical travel in the sight, i.e. axis 30, to match the gravity vector. This adjustment will help reduce windage error induced by the sight, and is especially helpful in hitting targets at extreme distances.

It will be understood that the adjustment member 14 is not limited for use with the particular bracket member 12 and selective sight assembly 16 shown and described, but can be used with other brackets and/or sights without departing from the spirit and scope of the invention.

Likewise, it will be understood that the selective sight assembly 16 can be used with other windage and/or elevation adjustment members, as well as other brackets, without departing from the spirit and scope of the invention. In addition, it will be understood that more than one pin can be installed in the sight, without departing from the spirit and scope of the invention.

It will be understood that more or less light collectors and/or thus more or less detent positions can be provided without departing from the spirit and scope of the invention. In addition two or more of the fluorescent-doped optical fibers can have different dopant properties so that the illuminated sight dots project different colors of light to further reduce the confusion that may be associated with two or more closely spaced sight dots of the same color.

Moreover, it will be understood that the term "light collector" can refer to regular optical fibers that accept light only at their ends or fluorescent-doped optical fibers that accept light along their lengths and at their ends, as well as other light gathering or transmitting devices. Accordingly, the above-described exemplary embodiment of the invention can be arranged so that the light source projects radiant energy toward the distal end of one of the optical fibers or the like, without departing from the spirit and scope of the invention.

It will be understood that the term "preferably" as used throughout the specification refers to one or more exemplary embodiments of the invention and therefore is not to be interpreted in any limiting sense. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. By way of example, although certain components have been described with dovetail-shaped or T-shaped grooves and other certain components have been described with mating dovetail-shape or T-shaped projections, it will be understood that such slots and projections can be reversed so that the shape of such slots and projections are not limited to the particular exemplary embodiments shown and described. It will be understood, therefore, that the present invention is not limited to the particular embodiments disclosed, but also covers modifications within the spirit and scope of the invention as defined by the appended claims.

What is claimed is:

1. A selective sight assembly comprising:
   a frame portion defining a sight window;
   a sight portion connectable to the frame portion, the sight portion including:
   a sight pin connectable to the frame portion; and
   a light conduit connected to the sight pin for movement therewith, the light conduit having a first light coupling end and a second light transmitting end that defines a sight point for view by a user; and
   a plurality of light collectors, each light collector having a second light coupling end for selective optical coupling with the first light coupling end;
   wherein movement between the light conduit and the light collectors causes optical coupling between the first light coupling end and one of the second light coupling ends.

2. A selective sight assembly according to claim 1, wherein the second coupling ends of the light collectors are spaced along the frame portion.

3. A selective sight assembly according to claim 2, wherein the sight pin is movable to discrete locations with respect to the frame portion to thereby optically couple the first light coupling end with one of the second light coupling ends.

4. A selective sight assembly according to claim 3, and further comprising a detent mechanism operably associated with the frame portion and the sight portion for securing the sight portion at the discrete locations along the frame portion such that the first light coupling end is in optical communication with one of the second light coupling ends of the plurality of light collectors.

5. A selective sight assembly according to claim 4, wherein optical coupling of the first light coupling end with one of the second light coupling ends causes a first optical effect at the sight point, and optical coupling of the first light coupling end with another of the second light coupling ends causes a second optical effect at the sight point.

6. A selective sight assembly according to claim 5, wherein the first and second optical effects comprise different wavelengths of light.

7. A selective sight assembly according to claim 6, wherein each light collector comprises a fluorescent-doped optical material that is capable of collecting radiant energy along its length and transmitting radiant energy to the second light coupling end.

8. A selective sight assembly according to claim 7, wherein the fluorescent-doped optical material comprises a fluorescent-doped optical fiber.

9. A selective sight assembly according to claim 8, wherein the light conduit comprises a clear optical fiber.

10. A selective sight assembly according to claim 1, wherein optical coupling of the first light coupling end with one of the second light coupling ends causes a first optical effect at the sight point, and optical coupling of the first light coupling end with another of the second light coupling ends causes a second optical effect at the sight point.

11. A selective sight assembly according to claim 10, wherein the first and second optical effects comprise different wavelengths of light.

12. A selective sight assembly according to claim 11, wherein each light collector comprises a fluorescent-doped optical material that is capable of collecting radiant energy along its length and transmitting radiant energy to the second light coupling end.

13. A selective sight assembly according to claim 12, wherein the fluorescent-doped optical material comprises a fluorescent-doped optical fiber.

14. A selective sight assembly according to claim 13, wherein the light conduit comprises a clear optical fiber.

15. A selective sight assembly according to claim 3, wherein the sight portion further comprises a sight base fixedly connected to the frame portion, the sight pin having a base section that is slidable along the sight base between the discrete positions.

16. A selective sight assembly according to claim 15, wherein the sight base includes one of a dovetail-shaped projection and dovetail-shaped groove and the base section includes the other of the dovetail-shaped projection and dovetail-shaped groove for slidably receiving the sight base.

17. A selective sight assembly according to claim 16, and further comprising a plurality of interchangeable sight pins, the base section of each sight pin being similar shape for slidable mounting on the sight base between the discrete positions.

18. A selective sight assembly according to claim 17, wherein each sight pin includes a pin section that extends from the base section, each pin section having a different configuration than the remaining pin sections.

19. A selective sight assembly according to claim 18, wherein the different configurations comprise different sizes for receiving light conduits of different sizes.

20. A selective sight assembly according to claim 1, and further comprising a plurality of sight pins interchangeably connected to the frame portion for slidable movement with respect thereto, each sight pin having a different configuration.

21. An illuminated sighting device comprising the selective sight assembly according to claim 1, and further comprising:
   a bracket member for attachment to an archery bow; and
   an articulated support connected between the selective sight assembly and the bracket member for adjusting a position of the selective sight assembly about first, second and third mutually orthogonal axes.

22. An illuminated sighting device according to claim 21, wherein the articulated support comprises:
   a locking member connected to the frame portion;
   a link pivotally connected to the locking member for adjustable rotational movement of the selective sight assembly about the first axis with respect to the link;
   a yoke pivotally connected to the link about the second axis for adjustable rotational movement of the selective sight assembly about the second axis with respect to the yoke; and
   an adjustment member pivotally connected to the yoke about the third axis for adjustable rotational movement of the selective sight assembly about the third axis with respect to the adjustment member.

23. An illuminated sighting device according to claim 22, wherein the adjustment member comprises:

an adjustment body pivotally connected to the yoke about the third axis;

a first adjustment block connected to the adjustment body for slidable movement of the first adjustment block in a direction parallel to the first axis for windage adjustment of the selective sight assembly; and a second adjustment block slidably connected to the first adjustment block for slidable movement of the first adjustment block in a direction parallel to the second axis for a first elevation adjustment of the selective sight assembly.

24. An illuminated sighting device according to claim 23, wherein the adjustment member further comprises a third adjustment block having a rear portion connected to the bracket member and a front portion slidably connected to the second adjustment block in a direction parallel to the second axis for a second elevation adjustment of the selective sight assembly.

25. An illuminated sighting device according to claim 24, wherein the first elevation adjustment comprises a first adjustment mechanism and the second elevation adjustment comprises a second adjustment mechanism.

26. An illuminated sighting device according to claim 25, wherein the second adjustment mechanism comprises:

a shaft rotatably connected to the third adjustment block about an axis parallel to the first axis;

an adjustment knob for manipulation by a user, the adjustment knob being connected to the shaft for rotation therewith; and a drive wheel connected to the shaft for rotation therewith, an outer periphery of the drive wheel engaging a surface of the third adjustment block to thereby cause sliding movement of the third adjustment block with respect to the second adjustment block when the adjustment knob is rotated.

27. An illuminated sighting device according to claim 26, wherein the shaft is movable toward and away from the surface of the third adjustment block to thereby adjust an engagement pressure of the drive wheel against the surface.

28. A sighting device comprising:

a sight having a frame portion and at least one sight pin connected to the frame portion;

a bracket member for attachment to an archery bow;

an articulated support connected between the sight and the bracket member for adjusting a position of the selective sight assembly about first, second and third mutually orthogonal axes;

a first member operably associated with the bracket member;

a second member operably associated with the sight and being slidably adjustable with respect to the first member, the second member having a surface;

a shaft rotatably connected to the first member;

an adjustment knob for manipulation by a user, the adjustment knob being connected to the shaft for rotation therewith; and a drive wheel connected to the shaft for rotation therewith, an outer periphery of the drive wheel engaging the surface of the second member to thereby cause sliding movement of the second member with respect to the first member when the adjustment knob is rotated.

29. A sighting device according to claim 28, wherein the articulated support comprises:

a locking member connected to the frame portion;

a link pivotally connected to the locking member for adjustable rotational movement of the sight about the first axis with respect to the link;

a yoke pivotally connected to the link about the second axis for adjustable rotational movement of the sight about the second axis with respect to the yoke; and an adjustment member pivotally connected to the yoke about the third axis for adjustable rotational movement of the sight about the third axis with respect to the adjustment member.

30. A sighting device according to claim 29, wherein the adjustment member comprises:

an adjustment body pivotally connected to the yoke about the third axis;

a first adjustment block connected to the adjustment body for slidable movement of the first adjustment block in a direction parallel to the first axis for windage adjustment of the sight; and a second adjustment block slidably connected to the first adjustment block for slidable movement of the first adjustment block in a direction parallel to the second axis for a first elevation adjustment of the sight.

31. A sighting device according to claim 23, wherein the adjustment member further comprises a third adjustment block having a rear portion connected to the bracket member and a front portion slidably connected to the second adjustment block in a direction parallel to the second axis for a second elevation adjustment of the sight.

32. A sighting device according to claim 31, wherein the first elevation adjustment comprises a first adjustment mechanism and the second elevation adjustment comprises a second adjustment mechanism.

33. A sighting device according to claim 32, wherein the second adjustment mechanism comprises:

a shaft rotatably connected to the third adjustment block about an axis parallel to the first axis;

an adjustment knob for manipulation by a user, the adjustment knob being connected to the shaft for rotation therewith; and a drive wheel connected to the shaft for rotation therewith, an outer periphery of the drive wheel engaging a surface of the third adjustment block to thereby cause sliding movement of the third adjustment block with respect to the second adjustment block when the adjustment knob is rotated.

34. A sighting device according to claim 33, wherein the shaft is movable toward and away from the surface of the third adjustment block to thereby adjust an engagement pressure of the drive wheel against the surface.

35. A sight assembly comprising:

a frame portion defining a sight window;

a sight portion connectable to the frame portion, the sight portion including:

a first interchangeable sight pin having a first base section and a first pin section;

a second interchangeable sight pin having a second base section and a second pin section;

wherein the first and second base sections are substantially similar in configuration and the first and second pin sections comprise different configurations so that each sight pin has a different visually distinguishable optical property; and a sight base fixedly connected to the frame portion, the sight base being configured to receive only one of the first and second base sections at a time so that only the first sight pin or the second sight pin is connectable to the frame portion with only the first pin section or the second pin section visible in the sight window.

36. A selective sight assembly according to claim 35, wherein the sight base includes one of a dovetail-shaped projection and dovetail-shaped groove and the base section of each sight pin includes the other of the dovetail-shaped projection and dovetail-shaped groove for slidably and adjustably receiving the sight base so that each sight pin is movable to discrete locations with respect to the frame portion to thereby optically couple the sight pin with different illumination components having different optical properties.

37. A sight assembly according to claim 35, wherein a size of the first pin section is greater than a size of the second pin section so that the first and second sight pins are visually distinguishable.

38. A sight assembly comprising:
a frame portion defining a sight window;
a sight portion connectable to the frame portion, the sight portion including:
   a first sight pin having a first base section and a first pin section;
   a second sight pin having a second base section and a second pin section;
   wherein the first and second base sections are substantially similar in configuration and the first and second pin sections comprise different configurations;
a sight base fixedly connected to the frame portion, the sight base being adapted to receive only one of the first and second base sections at a time;
a light conduit connected to each sight pin for movement therewith, the light conduit having a first light coupling end and a second light transmitting end that defines a sight point for view by a user; and
a plurality of light collectors, each light collector having a second light coupling end for selective optical coupling with the first light coupling end;
wherein sliding movement of the sight pin along the sight base causes optical coupling between the first light coupling end and one of the second light coupling ends.

39. A sight assembly according to claim 38, wherein the second coupling ends of the light collectors are spaced along the frame portion.

40. A selective sight assembly according to claim 39, wherein the sight pin is movable to discrete locations with respect to the frame portion to thereby optically couple the first light coupling end with one of the second light coupling ends.

41. A selective sight assembly according to claim 40, and further comprising a detent mechanism operably associated with the frame portion and the sight portion for securing the sight portion at the discrete locations along the frame portion such that the first light coupling end is in optical communication with one of the second light coupling ends of the plurality of light collectors.

42. A selective sight assembly according to claim 41, wherein optical coupling of the first light coupling end with one of the second light coupling ends causes a first optical effect at the sight point, and optical coupling of the first light coupling end with another of the second light coupling ends causes a second optical effect at the sight point.

43. A selective sight assembly according to claim 42, wherein the first and second optical effects comprise different wavelengths of light.

44. A selective sight assembly according to claim 43, wherein each light collector comprises a fluorescent-doped optical material that is capable of collecting radiant energy along its length and transmitting radiant energy to the second light coupling end.

45. A selective sight assembly according to claim 44, wherein the fluorescent-doped optical material comprises a fluorescent-doped optical fiber.

46. A selective sight assembly according to claim 45, wherein the light conduit comprises a clear optical fiber.

* * * * *